US008543804B2

(12) United States Patent
Moon et al.

(10) Patent No.: US 8,543,804 B2
(45) Date of Patent: Sep. 24, 2013

(54) ADAPTIVE SECURITY POLICY BASED SCALABLE VIDEO SERVICE APPARATUS AND METHOD

(75) Inventors: Yong Hyuk Moon, Daejeon (KR); Hyeok Chan Kwon, Daejeon (KR); Seungmin Lee, Daejeon (KR); Jae Hoon Nah, Daejeon (KR); Taek Yong Nam, Daejeon (KR); Dong Il Seo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 602 days.

(21) Appl. No.: 12/775,041

(22) Filed: May 6, 2010

(65) Prior Publication Data
US 2011/0145560 A1     Jun. 16, 2011

(30) Foreign Application Priority Data

Dec. 11, 2009    (KR) .................. 10-2009-0123132

(51) Int. Cl.
*H04L 9/00* (2006.01)
(52) U.S. Cl.
USPC ............... 713/150; 380/37; 380/45; 380/200; 380/201; 380/210; 380/279
(58) Field of Classification Search
USPC ......................................................... 713/150
See application file for complete search history.

(56) References Cited

U.S. PATENT DOCUMENTS

| 6,810,131 B2 * | 10/2004 | Nakagawa et al. ............ 382/100 |
| 7,406,176 B2 | 7/2008 | Zhu et al. |
| 2002/0094089 A1 * | 7/2002 | Kamiya et al. ................ 380/279 |
| 2003/0012376 A1 * | 1/2003 | Wee et al. ...................... 380/200 |
| 2004/0019681 A1 * | 1/2004 | Nakamura et al. ............ 709/226 |
| 2004/0196972 A1 * | 10/2004 | Zhu et al. ......................... 380/45 |
| 2005/0183118 A1 | 8/2005 | Wee et al. |
| 2006/0143435 A1 * | 6/2006 | Kwon ........................... 713/150 |
| 2006/0184789 A1 * | 8/2006 | Karasawa et al. ............. 713/160 |
| 2006/0256851 A1 * | 11/2006 | Wang et al. .............. 375/240.01 |
| 2007/0036354 A1 * | 2/2007 | Wee et al. ........................ 380/37 |

(Continued)

FOREIGN PATENT DOCUMENTS

| KR | 10-2006-0034677 | 4/2006 |
| KR | 10-2006-0120257 | 11/2006 |

(Continued)

OTHER PUBLICATIONS

"An Efficient Encryption and Key Management Scheme for Layered Access Control of H.264/Scalable Video Coding", Su-Wan Park et al., IEICE Trans. Inf. & Syst., vol. E92-D, No. 5, May 2009.

*Primary Examiner* — Kambiz Zand
*Assistant Examiner* — Yonas Bayou
(74) *Attorney, Agent, or Firm* — Kile Park Reed & Houtteman PLLC

(57) ABSTRACT

An adaptive security policy based scalable video service apparatus includes a video streaming server, an adaptive security policy server and a terminal. The video streaming server receives a service demand via a network and generates an encrypted streaming data. The adaptive security policy server analyzes a media structure and the service demand, by using a service profile received from the video streaming server, so as to generate a security policy description. The terminal generates and transmits the service demand to the video streaming server or the adaptive security server, obtains the encrypted streaming data from the video streaming server and decrypts the encrypted streaming data for playback, storing and retransmission.

20 Claims, 13 Drawing Sheets

(56) References Cited

U.S. PATENT DOCUMENTS

| | | | |
|---|---|---|---|
| 2007/0098162 A1* | 5/2007 | Shin | 380/201 |
| 2007/0116277 A1* | 5/2007 | Ro et al. | 380/201 |
| 2010/0014666 A1* | 1/2010 | Park et al. | 380/210 |
| 2010/0161823 A1* | 6/2010 | Jung et al. | 709/231 |
| 2011/0182353 A1 | 7/2011 | Bae | |

FOREIGN PATENT DOCUMENTS

| | | |
|---|---|---|
| KR | 10-2007-0045556 A | 5/2007 |
| KR | 10-2007-0121487 A | 12/2007 |
| KR | 10-2009-0112485 | 10/2009 |

\* cited by examiner

FIG.4

| ENCODING LEVEL ENCRYPTION PARTS | NAL LEVEL ENCRYPTION PARTS |
|---|---|
| IPM(INTRA PREDICTION MODE) VALUES | SPS (SEQUENCE PARAMETER SET) |
| | PPS (PICTURE PARAMETER SET) |
| RESIDUAL COEFFICIENTS (AC, DC) VALUE OF SIGN BITS | SLICE HEADER |
| MVD (MOTION VECTOR DIFFERENCE) VALUES | MACROBLOCK HEADER |
| PARAMETERS OF EXPONENTIA GOLOMB, CAVLC (CONTEXT-ADAPTIVE VARIABLE LENGTH CODING) AND CABAC (CONTEXT-ADAPTIVE BINARY ARITHMETIC CODING) | IDR (INSTANTANEOUS DECODING REFRESH) AND I (INTRA) FRAMES |
| ... | ... |

FIG.5

| SECURITY LEVEL | SELECTED PARTS TO BE ENCRYPTED | SERVICE DEMAND |
|---|---|---|
| SL1 | NO ENCRYPTION APPLIED (ORIGINAL VIDEO) | — |
| SL2 | IPMs (INTRA PREDICTION MODES) | ECONOMIC SERVICE |
| SL3 | SIGNS OF RESIDUE (TEXTURE) | MEDIUM SERVICE |
| SL4 | SIGNS OF RESIDUE (TEXTURE AND MOTION VECTOR) | PREMIUM SERVICE |
| SL5 | FULL ENCRYPTION | REUSE WITH TRANSCODING |

FIG.6

| CRYPTOGRAPHIC STRENGTH | ENCRYPTION ALGORITHMS | PERFORMANCE (MB/S) |
|---|---|---|
| 0.1 | SEAL | 168.75 |
| 0.2 | RC4 | 96.43 |
| 0.3 | BLOWFISH | 37.5 |
| 0.4 | KNUFU/KHAFRE | 33.75 |
| 0.5 | RC5 | 29.35 |
| 0.6 | RIJNDAEL | 21.09 |
| 0.7 | DES | 15 |
| 0.8 | IDEA | 13.5 |
| 0.9 | 3DES | 6.25 |
| ... | ... | ... |

FIG.7

| BITSTREAM LAYERS | PARTS TO BE ENCRYPTED | ENCRYPTION ALGORITHM | KEY LENGTH |
|---|---|---|---|
| 0 | INTRA MBs | AES | 192 |
| 1 | MVDs | 3DES | 192 |
| 2 | MVDs, IPMs | AES | 128 |
| 3 | FULL | 3DES | 128 |
| ⋮ | ⋮ | ⋮ | |

FIG.8

Given Selective Encryption Algorithm Set: $A_X = \{x_1, x_2, x_3, \ldots, x_N\}$   E800

Given Encoded Scalable Media: $M_S$   E810

$$\sum_{i=1}^{2^k} \frac{i}{2^k} \leq C(x_i) \leq \frac{|M|^{S_e}+1}{2} \quad \text{E820}$$

$$D_e = \sum_{i=1}^{S} D(S_i, E_{x_j}(S_i)) \text{ for } \forall j = 1,2,3,\ldots,N \quad \text{E830}$$

subject to Min $\dfrac{T_c(x_j)}{S}$,   E840

$$\frac{R(E_{x_j}(M_S)) - R(M_S)}{R(M_S)} \leq \alpha, \quad \text{E850}$$

satisfying format-compliance   E860

ADAPTIVE SECURITY POLICY BASED SCALABLE VIDEO SERVICE APPARATUS AND METHOD

CROSS-REFERENCE(S) TO RELATED APPLICATION(S)

The present invention claims priority to Korean Patent Application No. 10-2009-0123132, filed on Dec. 11, 2009, which is incorporated herein by reference.

FIELD OF THE INVENTION

The present invention relates to an organized and effective cryptographic technique for scalable video contents; and, more particularly, to adaptive security policy based scalable video service apparatus and method, wherein SVC (Scalable Video Coding) video contents can be protected most safely, differentially and effectively in respect of a cryptographic strength, a distortion factor and a decoding capability, by considering major service demands from users, e.g., network environments, service ratings, device performances and contents retransmission, when the contents are encoded by a video compression algorithm like a scalable video coding, transformed into a suitable structure depending on device performance and transmitted in the form of a video streaming to a device via networks.

BACKGROUND OF THE INVENTION

A video compression technology such as MPEG2, MPEG4, H.264 and the like normally supports a single layer video bitstream encoding for video services. Before the video encoding is proceeded, major factors for the video services including resolutions, FPS (Frame per Second) and image qualities should be predetermined according to terminal device performances, viewer ratings, network environments and the like.

Such a video compression should be performed respectively for all the video contents, depending on their respective encoding factors, so as to make a streaming service suitable for all the various device performances and service demands. Since, however, it is problematic in view of efficiency, it has been supposed to place a transcoder between a streaming server and a client terminal for supporting the transformation of video contents. Such a video transformation at a mid node is actually effective in reducing the necessary number of encoding steps for the streaming server of a head end, but there is also a drawback that it should be accompanied with an additional decoding at the mid node due to the fundamental problem of the single layer based video compression technology, which may result in a defective performance of the service. Because the additional burden due to such a mid node transformation seems unsolvable, a root level improvement is required to fundamentally solve the problem.

For example, there is a fatal security drawback that a full or a selective encryption of prior arts may be useless to secure data when the aforementioned technology is employed because a decryption that possibly causes a fatal security error is essentially necessary for implementing the aforementioned technology, in which an original video data obtained during the process of decoding at the transcoder, used as a mid nod for video transformation, should be encoded again.

In recent years, a multi layer SVC technology capable of forming a multi layer video has been developed, and the standardization thereof was completed in 2007 by ITU-T (International Telecommunication Union Telecommunication). This compression technology is different from the aforementioned single layer SVC technology in that the video image is composed of a base layer and enhancement layers, wherein the base layer contains a core information of the video data and can be independently decoded for playback whereas each enhancement layer contains only an auxiliary information for enhancing the quality of video images and should be accompanied with the base layer for video services because an independent decoding thereof is meaningless. Due to such a configuration, it is possible to satisfy various service demands in spite of applying only a single encoding. For example, if unnecessary portions of the enhancing layers are removed by using an extractor, it is possible to transmit a video stream suitable for network bandwidth and device performances such as a screen size, a network performance, and a decoding speed.

This advantageous configuration serves as a technical base of the selective encryption, in which even an encrypted video data can be transformed into a desired video format without a decryption process at a mid node including the extractor.

However, such selective encryption technologies of prior arts are mainly focused on an encryption for a single layer based video compression technology, and also the evaluation technique of a selective encryption for SVC is limited to measuring a distortion factor resulted from the encryption whereas a truly necessary cryptographic strength is not evaluated as it should be. Further, in case of a commercial streaming service, it must be necessary to have a criterion for deciding which methodology among the prior art encryption technologies would be better for securing data such as to provide reliable and safe services to a respective user, but research and development thereof has not been properly proceeded hitherto.

Recently, an advanced media service like IPTV faces big issues such as a safe retransmission and a private storing of the media data, and for supporting them it is necessary to suitably adapt cryptographic strengths according to service demands while transforming the media data.

Further, the video data encryption is different from a text based data encryption in that a huge data is encrypted and the encryption of specific bits is restricted to comply with a respective video coding format. Accordingly, it is necessary to consider which part of the video data is desired to secure with which encryption algorithm. If an encryption does not comply with a corresponding video format, the following decoding thereof will be impossible.

The aforementioned video distortion by encryption has been generally used to prevent an unauthorized user from viewing the video image, and is now drawing more attentions as a means for inducing users to subscribe for commercial or supplementary viewing channels and programs by providing a time-limited broadcast or a partially exposed broadcast. In addition, it can be used to enable a safe automatic differentiation or differentiation of the streaming service by providing a streaming image of suitable type and quality corresponding to viewer's subscription type and rating.

In order to overcome the aforementioned drawbacks, it is necessary to develop and provide an adaptive policy model capable of providing reliable and safe streaming services by securing the SVC video image most safely, differentially, and effectively in respect of a cryptographic strength, a distortion factor, and a decoding performance, according to major service demands for users such as network environments, service ratings, device performance, and contents retransmission.

SUMMARY OF THE INVENTION

In view of the above, the present invention provides a safe differential streaming service by complying with a respective video coding format, and setting a security policy according to major service demands such as network environments, service ratings, and device performances.

Further, the present invention provides a process of reviewing whether such a security policy is optimized or not in respect of a cryptographic strength and a decoding performance as well as a distortion factor.

Further, the present invention provides a safe adaptation of a new security technique to video images, without the need of decoding and decryption, when a newly issued security policy is applied according to a security policy update according to service demands of a second client terminal, wherein the security policy update is requested together with a structural transformation of media data in order to support safe retransmission and private storing of the media data, which are increasingly requested nowadays.

Further, the present invention provides scalable video service apparatus and method based on an adaptive security policy, wherein encryption parts, encryption algorithms, and key lengths are set up through analyses of service demands and media data structures; and cryptographic strengths, distortion factors, and restrictions of the presently set policy are checked and then formed into a security policy description, so that reliable and safe streaming services can be provided by securing SVC video contents most safely, differentially, and effectively in respect of a cryptographic strength, a distortion factor, and a decoding performance, according to service demands, thereby providing an optimized scalable video encryption technology.

In accordance with a first aspect of the present invention, there is provided an adaptive security policy based scalable video service apparatus, including:

a video streaming server that receives a service demand via a network and generates an encrypted streaming data;

an adaptive security policy server that analyzes a media structure and the service demand, by using a service profile received from the video streaming server, so as to generate a security policy description; and a terminal that generates and transmits the service demand to the video streaming server or the adaptive security server, obtains the encrypted streaming data from the video streaming server and decrypts the encrypted streaming data for playback, storing and retransmission.

Preferably, the video streaming server operates a server side media repository and performs an adaptive encryption during a media encoding process by using the security policy description received from the adaptive security server.

Preferably, the video streaming server includes: a service demand receiving portion that receives the service demand from the terminal; a service profile analysis requesting portion that forms the service profile by using the received service demand and media layer structure information, transmits thus generated service profile to the adaptive security policy server and collects the security policy description from the adaptive security policy server; a media encoding and interpreting portion that analyzes a media layer structure to generate the media layer structure information and performs a media encoding; a server side media repository that stores a non-encrypted original media data; an adaptive encryption portion that performs an adaptive encryption according to the security policy description during a media encoding; a streaming binding portion that adaptively transmits the encrypted streaming data to the terminal via the network.

Preferably, the terminal includes: a service demand transmitting portion that forms and transmits the service demand to the video streaming server; a streaming unbinding portion that receives the encrypted streaming data from the video streaming server, and extracts and classifies the received encrypted streaming data into a video and the security policy; a media decoding and interpreting portion that decodes the encrypted streaming data transmitted from the streaming unbinding portion, and analyzes an encryption part thereof to be encrypted for each layer; a terminal side media repository that stores the encrypted streaming data transmitted from the streaming binding portion; a media retransmitting portion that retransmits, when receiving a retransmission request from a secondary viewing terminal a media from the terminal side media repository to the secondary viewing terminal, the media being transformed and having a readjusted cryptographic strength; a security policy requesting portion that transmits, when the media retransmitting portion requests to issue a new security policy description, a new security policy description issuance request message to the adaptive security policy server and transmits, when receiving the new security policy description from the adaptive security policy server, the new security policy description to the media decoding and interpreting portion; an adaptive encryption/decryption portion that performs an adaptive decryption when the media decoding and interpreting portion decodes, or performs an adaptive encryption when readjusting the cryptographic strength for the retransmission; and a media transforming portion that transforms a media layer structure based on a service demand of the secondary viewing terminal, when the retransmission is requested.

Preferably, the adaptive security policy server sets up an encryption part to be encrypted, an encryption algorithm and an encryption key length, and checks a cryptographic strength, a distortion factor and a restriction according to the analyzed media structure and demand.

Preferably, the adaptive security server includes: an analyzing portion that analyzes the media structure and the service demand; a setup portion that designates an encryption part to be encrypted, an encryption algorithm and an encryption key length of a scalable video, and verifies an effectiveness thereof, so as to generate the security policy description; and a repository portion that stores and manages the security policy description generated by the setup portion.

Preferably, the analyzing portion includes: a service profile receiving portion that receives a request for issuing the security policy description from the video streaming server or the terminal, and extracts information on the media structure and the service demand therefrom; a media structure and demand analyzing portion that analyzes the media structure and the service demand by using the information extracted by the service profile receiving portion, and transmits the analyzed contents to the setup portion so as to request the description generation.

Preferably, the setup portion includes: an encryption part setup portion that receives a request for setting up a security policy, and decides an encryption part for each media layer; an algorithm and key length setup portion that decides an encryption algorithm and an encryption key length for each media layer; a checking portion that checks an effectiveness of a cryptographic strength, a distortion factor and a restriction of an initial version security policy obtained via the encryption part setup portion and the algorithm and key length setup portion; and a security policy description generating portion that generates and transmits the security policy description to the video streaming server or the terminal after the checking process is completed by the checking portion.

Preferably, the repository portion includes a security policy repository that stores, updates and deletes a security policy, according to a request from the security policy description generating portion.

In accordance with a second aspect of the present invention, there is provided an adaptive security policy based scalable video service method for providing a video streaming service from a video streaming server to a terminal, the method comprising:

receiving from the video streaming server a service policy description issuance request along with a service profile;

extracting a service demand and media layer structure information from the service profile;

analyzing the service demand and checking a distribution ratio of visually important parts of a scalable video;

generating a security policy description based on the service demand and the distribution ratio;

storing the security policy description in a database; and transmitting the security policy description to the video streaming server.

Preferably, said generating the security policy description includes: designating, based on a policy table that considers both of a security level and the service demand, parts to be encrypted for each layer of the scalable video; setting up, for each layer of the scalable video, encryption algorithm and an encryption key length while considering a cryptographic strength and an encryption speed; generating a draft security policy description including the parts to be encrypted, the encryption algorithm and the encryption key length; performing test encryption based on the draft security policy; evaluating the test encryption to determine whether the draft security policy description satisfies a preset criteria; and generating the security policy description based on the draft security policy description satisfying the preset criteria.

Preferably, said evaluating the test encryption includes: evaluating a cryptographic strength; evaluating a distortion factor; evaluating an encryption speed and changes on a video encoding compression ratio; and verifying compliance of a video compression rules.

The method may further include querying the database to find therein a security policy description satisfying the service profile, and transmitting to the video streaming server the security policy description found in the database.

The method may further include: receiving from the terminal a service policy description issuance request for retransmission along with a service demand for retransmission; and generating a security policy description for retransmission and transmitting the security policy description for retransmission to the terminal.

Preferably, said generating the security policy description for retransmission includes: selecting network abstract layer level parts to be encrypted, an encryption algorithm and a encryption key length for each bitstream layer; generating a draft security policy description including the parts to be encrypted, the encryption algorithm and the encryption key length; performing test encryption based on the draft security policy; evaluating the test encryption to determine whether the draft security policy description satisfies a preset criteria; and generating the security policy description for retransmission based on the draft security policy description satisfying the preset criteria.

in accordance with a third aspect of the present invention, there is provided an adaptive security policy based scalable video service method of a terminal for providing a scalable video service by receiving an encrypted data from a video streaming server, the method comprising:

transmitting a streaming service request along with a service demand to the video streaming server;

separately extracting video data, a security policy description and streaming control data from the encrypted data received from the video streaming server; and performing adaptive decryption on the video data based on the security policy description.

The method may further include transmitting, when receiving from other terminal a request for retransmission of the video data, the video data to said other terminal.

Preferably, said transmitting the video data to said other terminal includes: receiving from said other terminal a service demand for the retransmission; requesting an adaptive security policy server to issue, based on the service demand for the retransmission, a security policy description for the retransmission; receiving the security policy description for the retransmission from the adaptive security policy server; and performing adaptive encryption on the video data based on the security policy description for the retransmission.

Preferably, when receiving the streaming service request along with the service demand from the terminal, the video streaming server forms a service profile by merging layer structure information on the video data with the service demand, and then requests an adaptive security policy server to issue the security policy description based on the service profile.

Preferably, the video streaming server performs adaptive encryption on the video data based on the security policy description received from the adaptive security policy server, and then transmitting to the terminal the encrypted video data together with the security policy description and the streaming control data.

In a prior art, a selective encryption is collectively employed without consideration of service demands and various device performances but only depending on distortion factor information, and a prior art transcoding based selective encryption algorithm has the same security defect as a single layer based video compression technique has. The present invention is different from these prior arts in that: encryption parts, encryption algorithms, and encryption key lengths are set up differentially across layers, in respect of main points such as cryptographic strengths, distortion factors, and restrictions, for SVC based scalable video contents in which streaming can be restructured depending on network environments, service ratings, and device performances; and the cryptographic strengths and the distortion factors are readjusted with a safe method (without decoding, decryption, nor re-encoding) by considering the characteristics of a storing terminal (a first viewing terminal) or a reuse terminal (a second viewing terminal) so as to quickly deal with new issues such as retransmission and private storing of the contents, such that the adaptive security policy for a scalable video service technique can be provided to guarantee safer, more effective, and differential video streaming service in view of the security technology.

BRIEF DESCRIPTION OF THE DRAWINGS

The above and other objects and features of the present invention will become apparent from the following description of embodiments given in conjunction with the accompanying drawings, in which:

FIG. 4 is a table in which main encryption parts of a scalable video image are classified into two categories of an encoding level encryption and an NAL level encryption;

FIG. 5 is a table illustrating which parts of each scalable video coding image data layer are selected for encryption, depending on service demands, so as to enable the differentiation of cryptographic strengths, in accordance with an embodiment of the present invention;

FIG. 6 is a table in which encryption algorithms capable of being applied to each layer of video coding image data are classified according to a cryptographic strength and an algorithm performance speed;

FIG. 7 is a table illustrating a security policy description formed by the adaptive security policy server of FIG. 3;

FIG. 8 shows an equation for evaluating a security policy description in respective of cryptographic strengths, distortion factors, and restrictions;

DETAILED DESCRIPTION OF THE EMBODIMENTS

Hereinafter, embodiments of the present invention will be described in detail with reference to the accompanying drawings, which form a part hereof.

Figure 1:
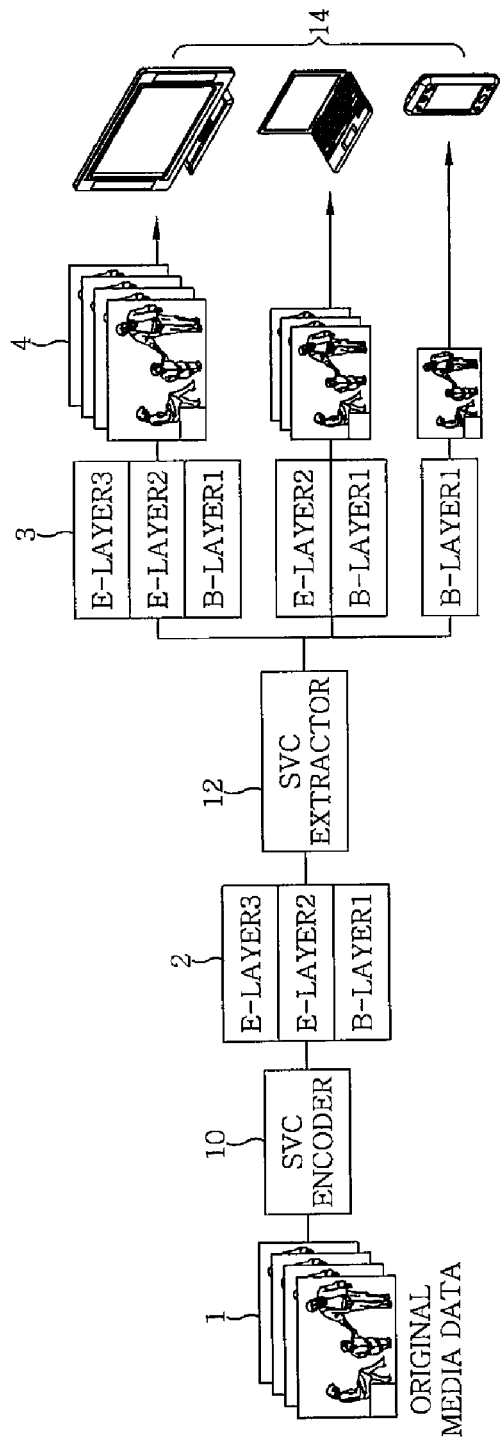
FIG. 1 is a schematic block diagram illustrating a scalable video streaming service in accordance with an embodiment of the present invention.

FIG. 1 illustrates a schematic model of a streaming service configuration in which a scalable video data encoded according to an embodiment of the present invention is transmitted with certain structural transformations accompanied therewith. The configuration includes an original media data 1, a scalable video coding (hereinafter, simply referred to as "SVC") encoder 10, an SVC extractor 12 and a viewing terminal group 14.

The original media data 1 is encoded into a multi layer form of SVC video data layers 2 (B-Layer1, E-Layer2, and E-Layer3) via the SVC encoder 10. Before the encoded original media data 1 is transmitted to each terminal of the viewing terminal group 14, it is determined whether the SVC extractor 12 extracts, i.e., removes, some of the SVC video data layers 2 or not, depending on a respective performance of a target terminal, via a SVC video compression technique.

Figure 2:
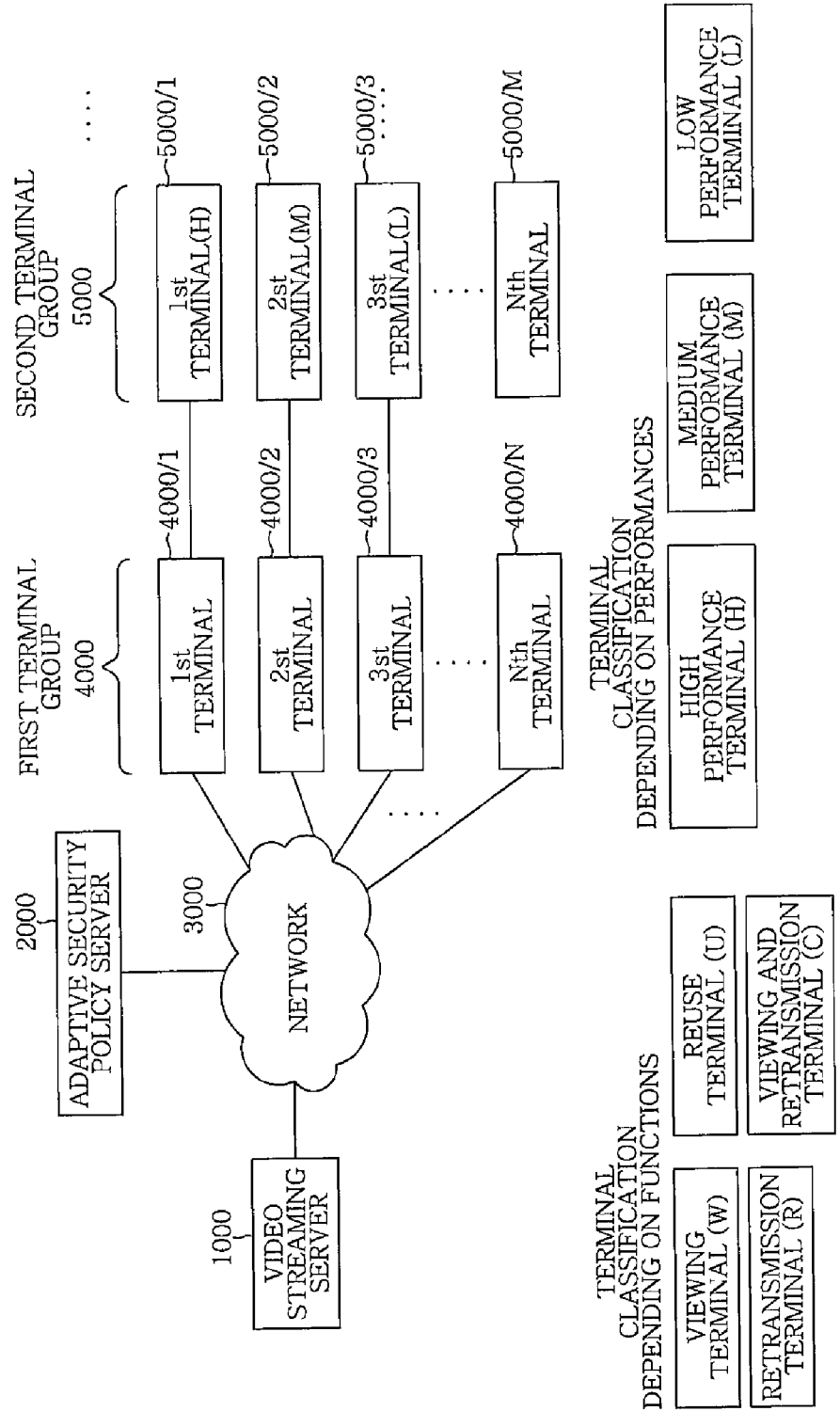
FIG. 2 is a schematic block diagram illustrating a scalable video encryption apparatus based on an adaptive security policy in accordance with an embodiment of the present invention.

FIG. 2 is a schematic block diagram illustrating a scalable video service apparatus based on an adaptive security policy in accordance with an embodiment of the present invention.

The apparatus includes a video streaming server 1000, an adaptive security policy server 2000, a first terminal group 4000 and a second terminal group 5000.

The video streaming server 1000 basically performs following functions: encoding the source media data 1 based on the SVC video compression technique; forming a streaming therefrom; and binding the streaming to a network protocol.

Specifically, after receiving a streaming service request from a certain terminal, for example, a 1st terminal 4000/1 of the first terminal group 4000 while simultaneously obtaining service demands, the video streaming server 1000 forms a service profile by using the service demands together with the layer information of video data requested by the 1st terminal 4000/1; transmits the service profile to the adaptive security policy server 2000 via a network 3000; applies an adaptive encryption technique during the SVC video encoding, based on a security policy description issued by the security policy server 2000, thereby enabling a safe transmission.

Depending on service requirements or performance conditions, the video streaming server 1000 may be operated in an independent way with respect to a streaming binding server, a video contents repository, an encoding server, and the like.

Those related in the arts can easily understand that such processes herein as encoding video data, forming packets, and binding to protocols may be performed based on a motion predictive video compression technique and a video streaming server operation technique.

The network 3000 is, for example, an IP (Internet Protocol) based wire/wireless network and takes the role of supporting the wire/wireless communication environment between the video streaming server 1000 and the client terminal groups 4000 and 5000. Such an IP based wire/wireless network means an open computer network architecture and may be the Internet, for example, which provides TCP/IP protocols and various services thereon such as HTTP (Hyper Text Transfer Protocol), Telnet, FTP (File Transfer Protocol), DNS (Domain Name System), SMTP (Simple Mail Transfer Protocol), SNMP (Simple Network Management Protocol), NFS (Network File Service), and NIS (Network Information Service). Specifically, the IP based wire/wireless network provides an environment of making it possible for a certain terminal, for example, the 1st terminal 4000/1 of the first terminal group 4000 to access the video streaming server 1000.

Further, the IP based wire/wireless network takes the role of confirming the mobility of the first terminal group 4000, and performs such functions as a handover and a wireless resource management. The wireless network includes a base station and a cell controller, and supports both of the synchronous and asynchronous systems. For the synchronous system, the base station and the cell controller are respectively BTS (Base Transceiver Station) and BSC (Base Station Controller); and, for the asynchronous system, they are respectively Node B and RNC (Radio Network Controller). The wireless network is not limited to the above but may include GSM (Global System for Mobile communication), instead of CDMA, and all the future mobile communication system access networks possible to be developed.

In response to a security policy issuing request received via the network 3000, the adaptive security policy server 2000 performs an analysis about the video layer information and then identifies the service demands such as device performances and viewer ratings, and finally generates a security policy description suitably based on two of conditions therefrom. Further, the adaptive security policy server 2000 may retrieve a suitable pre-issued security policy description, which satisfies the corresponding requirements, from a security policy repository, prior to the step of forming a security policy. The security policy description includes those contents of setting up encryption parts of the video data, encryption algorithms to be used, and encryption key lengths differentially across layers.

In addition, the adaptive security policy server 2000 performs to verify the effectiveness of the first version security policy in respect of cryptographic strengths, distortion factors, and restrictions of video compression theories, and supports an adaptive application of an encryption technique, via security policy updates, in case of a contents retransmission and a private storing.

The adaptive security policy server 2000 is capable of providing an encryption technique that can guarantee the security continuity without exposure of the original video data, in case of the contents retransmission accompanied with a structural transformation. Though if the media transformation is not accompanied, when a storing is necessary for a future reuse, the security of a stored data can be enhanced by the security policy update.

The first terminal group 4000 can request a streaming service to the video streaming server 1000 while making the service demands be included therein as additional information, and serves as a streaming client for receiving, viewing (decoding and rendering), retransmitting, or storing a streaming data transmitted via the network 3000.

A respective terminal included in the first terminal group 4000, for example, the 1st terminal 4000/1 is capable of extracting and composing such information as subscriber IDs, subscription types, service ratings, demanded contents, and terminal performances, so as to transmit the service demands.

In addition, the 1st terminal 4000/1 obtains corresponding service demands from a respective terminal included in the second terminal group 5000, for example, a 1st terminal 5000/1, and can requests a security policy update for retransmission to the adaptive security policy server 2000.

The second terminal group 5000 generally performs the same functions as those of the first terminal group 4000, besides that it receives streaming data from a respective terminal of the first terminal group 4000. Further, the second terminal group 5000 responses to a service demand transmission request from a respective terminal of the first terminal group 4000.

Each of the terminals in the first and the second terminal group 4000 and 5000, for example, the 1st terminal 4000/1 or the 1st terminal 5000/1 is regarded to have a SVC video decoder, a transformer, and an encryption/decryption device.

Respective terminals may be classified into a viewing client, a retransmission (real time retransmission) client, a reuse (storing for later view) client, and a viewing and retransmission client, depending on their functions.

In another view, respective terminals may be classified into a high, a medium, and a low performance client, depending on their device performances.

Figure 3:
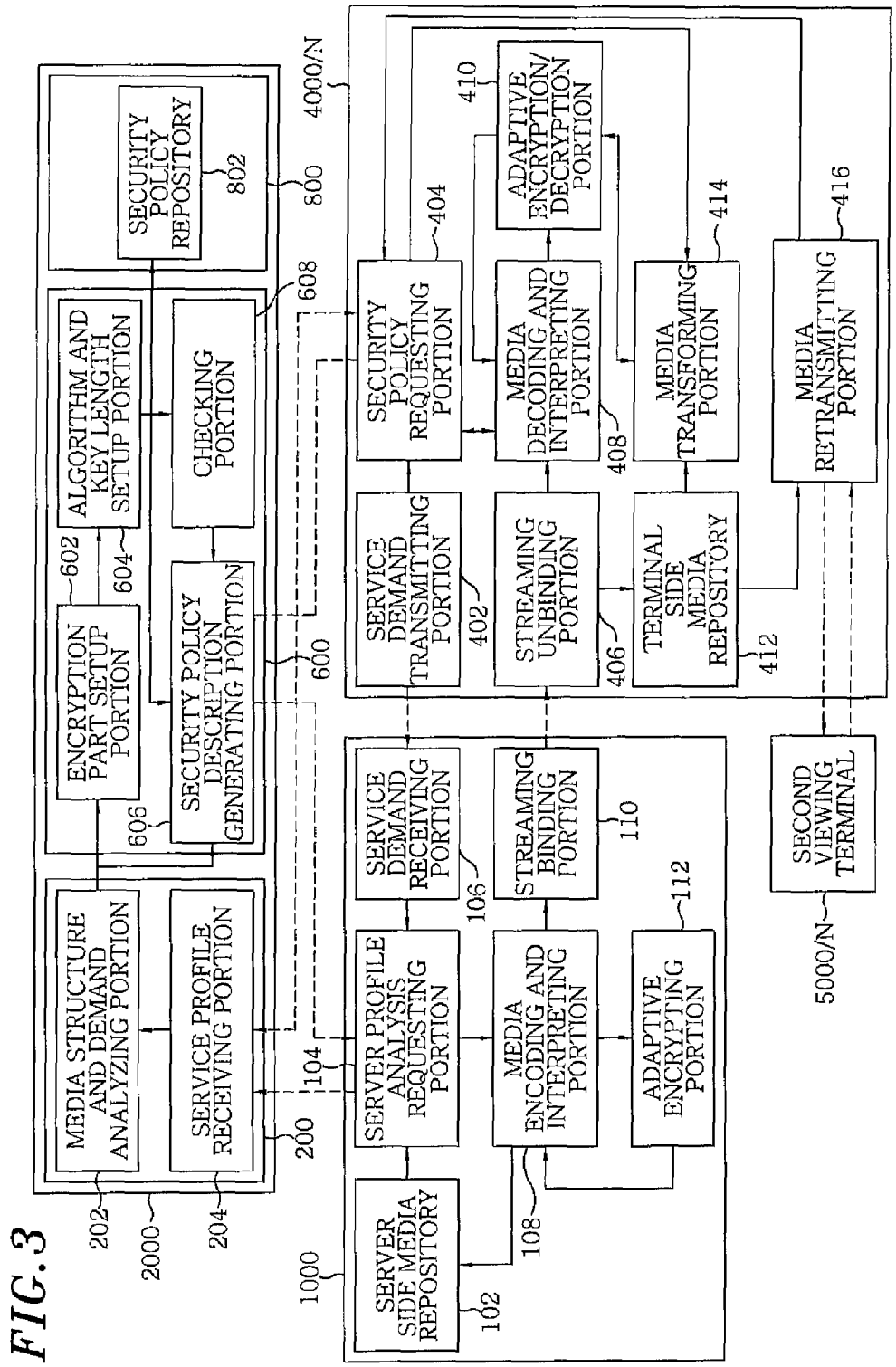
FIG. 3 is a detailed block diagram illustrating connections among a video streaming server, an adaptive security policy server, and a certain viewing terminal in terminal groups of FIG. 2.

FIG. 3 is a detailed block diagram illustrating connections among the video streaming server 1000, the adaptive security policy server 2000, and a certain viewing terminal in the first and second terminal groups 4000 and 5000 of FIG. 2.

The video streaming server 1000 includes a server side media repository 102, a service profile analysis requesting portion 104, a service demand receiving portion 106, a media encoding and interpreting portion 108, a streaming binding portion 110, and an adaptive encrypting portion 112.

The media repository 102, which means a database for containing a source media data like a non-encrypted video data, takes the role of returning a requested video data, or returning a layer structure information of the corresponding video data to the service profile analysis requesting portion 104, in response to a request from the media encoding and interpreting portion 108.

It is possible to employ such products as a general RDBMS, an XML-based DBMS, or a multimedia specific DBMS for implementing the media repository 102.

When receiving service demands from the service demand receiving portion 106, the service profile analysis requesting portion 104 requests an analysis for a layer structure information of a related video data to the media encoding and interpreting portion 108; returns the analyzed layer structure information of the video data to the media repository 102; forms a service profile by combining the above two kinds of information; transmits the service profile to a service profile receiving portion 204 of the adaptive security policy server 2000; and finally receives and provides a security policy description to the media encoding and interpreting portion 108 such that it can be used for a media-adaptive encoding and encryption.

When receiving a request from a service demand transmitting portion 402 of a viewing terminal 4000/N, the service demand receiving portion 106 transmits an analysis thereof to the service profile analysis requesting portion 104.

The media encoding and interpreting portion 108 has a basic role of encoding video data according to a SVC video compression rule, and an additional role of analyzing which layer structure is used for encoding the corresponding video data.

The streaming binding portion 110 takes the role binding NAL (Network Abstract Layer) units, which are an encoded video data, together with a security policy description, which is issued from the adaptive security policy server 2000, to a protocol of a normal IP based Internet wire/wireless network. At this point, the streaming binding portion 110 simultaneously takes the role of reconstructing a packet structure of the above data according to a streaming protocol specification.

The adaptive encrypting portion 112 takes the role of encrypting right parts by using preset encryption algorithms and keys, according to a security policy description, wherein it may be implemented together with a sub-module or a function of the media encoding and interpreting portion 106 in a unified way, in some cases.

The adaptive security policy server 2000 includes an analyzing portion 200, a setup portion 600, and a repository portion 800. The analyzing portion 200 has a media structure and demand analyzing portion 202, and a service profile receiving portion 204. The setup portion 600 has an encryption part setup portion 602, an encryption algorithm and key length setup portion 604, a security policy description generating portion 606, and a checking portion 608 for checking cryptographic strengths, distortion factors, and restrictions. The repository portion 800 has a security policy repository 802.

The media structure and demand analyzing portion 202 of the analyzing portion 200 takes the role of: extracting the media layer structure information and the service demands independently; analyzing a distribution of visually meaningful video data for each layer; identifying a subscription type, a device performance, and the like of a target viewing terminal 4000/N via the service demands; requesting a security policy setup and a security policy description generation by transmitting the subscription type, the device performance, and the like to the encryption part setup portion 602 of the setup portion 600.

The service profile receiving portion 204 of the analyzing portion 200 takes the role of receiving a request of generating a security policy description or updating a security policy from the video streaming server 1000 and the respective viewing terminal 4000/N.

The encryption part setup portion 602 of the setup portion takes the role of setting up specific parts of a video data to be encrypted selectively across layers, when receiving a security policy setup request from the media structure and demand analyzing portion 202 of the analyzing portion 200.

The encryption algorithm and key length setup portion 604 of the setup portion 600 takes the role of setting up an encryption key length to be used for the encryption and an encryption algorithm used actually to encrypt the encryption parts selected differentially across layers.

The security policy description generating portion 606 of the setup portion 600 takes the role of: generating a description from the encryption parts, the encryption algorithms, and the key lengths, if each of them has been set up without an error; and transmitting the description to the service profile analysis requesting portion 104 of the video streaming server 1000 or a security policy requesting portion 404 of the viewing terminal 4000/N.

The checking portion 608 of the setup portion 600 takes the role of: evaluating whether the aforementioned encryption parts, encryption algorithms, and key lengths are appropriate in respective of the cryptographic strengths, the distortion factors, and the restrictions; and, if confirming that there is no error, requesting an issue of the description to the security policy description generating portion 606.

The security policy repository 802 of the repository portion 800 takes the role of: storing the security policy description generated through the aforementioned process; and returning a response message and a related data in response to a retrieval request, or modifying or deleting a specific portion of the description.

The viewing terminal 4000/N includes the service demand transmitting portion 402, the security policy requesting portion 404, a streaming unbinding portion 406, a media decoding and interpreting portion 408, an adaptive encryption/decryption portion 410, a terminal side media repository 412, a media transforming portion 414, and a media retransmitting portion 416.

The service demand transmitting portion 402 takes the role of: forming a service demand according to a service type and a terminal performance; transmitting the service demand to the service demand receiving portion 106 of the video streaming server 1000; and, if a retransmission or a private storing is necessary, transmitting a related information to the security policy requesting portion 404 for a security policy update.

The security policy requesting portion 404 requests a security policy update to the security policy description generating portion 606 of the adaptive security policy server 2000 in response to a request from the media retransmitting portion 416 or the terminal side media repository 412; receives an updated security policy description; and transmits a received security policy contents to the media transformation 414.

The streaming unbinding portion 406 takes the role of: extracting an encrypted video data, a security policy description, and other control information from a streaming data received from the streaming binding portion 110 of the video streaming server 1000; and requesting a video playback by transmitting the above to the media decoding and interpreting portion 408, or transmitting the aforementioned protocol unbinding data group to the terminal side media repository 412.

When retransmission or private storing of the video data obtained from the streaming unbinding portion 406 is necessary, the media decoding and interpreting portion 408 obtains an updated security policy description from the security policy requesting portion 404, and decrypts and decodes the encrypted video data while cooperating with the adaptive encryption/decryption portion 410 according to the updated security policy.

The adaptive encryption/decryption portion 410 performs an adaptive decryption according to contents of the security policy description obtained from the security policy requesting portion 404 when the encrypted video data is decoded, and readjusts (enhances) the cryptographic strength and the distortion factor by performing an additional encryption according to an updated security policy description when a media transformation or a private storing is requested.

The terminal side media repository 412 takes the role of storing the encrypted video data, the security policy description, and other control information, and is responsible for the process of adding/deleting/modifying the stored video data group according to a request from the media transforming portion 414 or the media retransmitting portion 416.

The media transforming portion 414 cooperates with the adaptive encryption/decryption portion 410 in response to a reuse demand from the second client terminal 5000/N or a private storing demand from the first client terminal 4000/N for a scalable video, by using the updated version of the security policy description obtained from the security policy requesting portion 404, so as to perform a series of processes related with a video structure transformation (extended layer removal) and a cryptographic strength readjustment (enhancement), and the like.

The media retransmitting portion 416 takes the role of providing a real time or a non-real time video streaming data from the terminal side media repository 412 to the second client terminal 5000/N. If the second client terminal 5000/N has a special service demand, the media retransmitting portion 416 receives it prior to performing the above role; requests a security policy update for the video transformation and the cryptographic strength readjustment; and retransmits the media data, which is transformed and adaptively re-encrypted according to the updated security policy description, to the second client terminal 5000/N.

Being requested by the media retransmitting portion 416 of the first viewing terminal 4000/N to transmit the special service demand for the media reuse, the second viewing terminal 5000/N returns it, and receives a scalable video data, which is transformed in its structure and adaptively re-encrypted according to the updated security policy description.

Now, with reference to FIGS. 4 to 13, an adaptive security policy based encryption method for a scalable video will be explained. In detail, there are explained: a selective and differential setup technique for encryption parts, encryption algorithms, and encryption key lengths; a technique for evaluating a cryptographic strength, a distortion factor, restrictions, and a description format of an initial security policy; and a concrete operation process for readjusting a cryptographic strength in case of retransmission and private storing of a scalable video data, for the purpose of generating an adaptive security policy description.

It would be better for understanding the below explanation to know that an object of encrypting a multimedia data such as a video is to conceal a property or an expressing meaning of the original data and, therefore, it is more effective and can enhance the effect of concealment to selectively protect a visually meaningful video data.

As shown in FIG. 4, visually meaningful parts may be classified according to respective steps of a SVC encoding. Specifically, there are two general categories of an encoding level encryption and an NAL level encryption, wherein the first one refers to an encryption that is performed during the steps of a DCT transformation, a quantization, and an entropy coding; and the second one refers to what is performed for an NAL type compressed video data. Those related in the art may easily understand the above classification.

FIG. 5 is a table illustrating which parts of each SVC video data layer are selected, depending on service demands, to be encrypted so as to adjust cryptographic strengths, in accordance with an embodiment of the present invention.

Herein, "Security Level" category shows kinds of security levels defined according to a preset standard; "Selected Parts to be Encrypted" category shows parts to be encrypted per security levels for each SVC video layer; and "Service Demand" category shows a respective service type (subscription type) suitable for a corresponding security level.

For example, the first security level SL1 means that there is no encryption applied; the second one SL2 means that only IPMs (Intra Prediction Modes) part is encrypted; and it means that the cryptographic strength gradually increases as it goes from SL1 to SL5.

Further, the last security level SL5 means that all the visually important data of a selected layer is totally encrypted so as to enhance the cryptographic strength in case of retransmission (reuse).

In addition, the classification of FIG. 5 may be composed in a coarse-grained or a fine-grained way in advance by a security policy or a service administrator, and a more subdivided classification is also possible.

FIG. 6 is a table in which encryption algorithms capable of being applied to each layer of SVC video data are classified according to a cryptographic strength and an algorithm performance speed. This classification may also be composed in a coarse-grained or a fine-grained way according to service types and administrating policies. Those related in the art may understand that the present invention is not limited to the embodiment shown in FIG. 6.

Herein, "Cryptographic Strength" refers to an index representing a relative strength of a security level, which can be made quantitative through a relative readjustment when a certain encryption algorithm is added. It is assumed that a designated key length is selected from a group comprised of 128, 192, 256, and 512 bits, or the like.

Besides, it may be considered to add a simple encryption algorithm such as a XOR (Exclusive-OR) and a permutation operation.

FIG. 7 illustrates an embodiment of a security policy description formed by the adaptive security policy server 2000 of FIG. 3.

As shown in the table of FIG. 7, it is possible in accordance with the embodiment of the present invention to: differentiate the parts to be encrypted across bitstream layers; differentiate the encryption algorithms to be used across the layers; and designate the key lengths separately, thereby enabling to designate various cryptographic strengths. Further, because the distortion factor varies depending on the above setup, it is possible to provide a more reliable, differential, and effective video streaming service suitable for the service demands.

In addition, the separate designation of a key length for each bitstream layer shown in FIG. 7 is advantageous in that the access an encrypted scalable video data can be more precisely controlled.

Herein, MBs is an abbreviation for "Macroblocks"; and MVDs, for "Motion Vector Differences".

FIG. 8 illustrates an embodiment of an equation for evaluating a security policy description, generated by the adaptive security policy server 2000, in respective of cryptographic strengths, distortion factors, and restrictions.

The first line E800 "$A_x = \{x_1, x_2, x_3, \ldots, x_N\}$" refers to a given selective encryption algorithm set, wherein each element $x_i$ (i=1 to N) may be determined depending on a certain combination of those factors selected from a group composed of an encryption part, an encryption algorithm, an encryption key length, an encryption layer, and the like.

The second line E810 "$M_s$" is a symbol for expressing a given encoded scalable media.

In view of measuring a cryptographic strength, the third line E820

$$"\sum_{i=1}^{2^k} \frac{i}{2^k} \leq C(x_i) \leq \frac{|M|^{S_2}+1}{2}"$$

(k: key length) means that, if a selective encryption algorithm $x_i$ is used for the video encryption, a cost (for example, a complexity) for finding out an original bit of the video is determined between a lower bound of finding out an encryption key length and an upper bound of finding out a real encrypted video segment bit by using a guesswork based brute force approach. That is to say, it is more difficult than predicting the encryption key but easier than guessing the video segment via endless substitutions. This equation indirectly expresses the cryptographic strength of $x_i$ as the complexity.

For measuring a distortion factor, the fourth line E830

$$"D_e = \sum_{i=1}^{s} [D(s_i, E_{x_j})(s_i)) \text{ for } \forall j = 1, 2, 3, \ldots, N"$$

is used, wherein "D( )" is a function for measuring a distortion of an encrypted video with respect to an original video, and the function "$E_{x_j}(s_i)$" means that a segment $s_i$ is encrypted by using a selective video encryption algorithm $x_j$. Accordingly, $D_e$ of the present equation expresses a total sum of distortion factors resulted from those encryptions applied to respective video segments.

Herein, it is preferable to understood that: a certain selective video encryption algorithm capable of encrypting larger parts does not always guarantee a higher distortion factor; and a higher distortion factor is not always directed to a higher cryptographic strength. Compared with the present index, another index PSNR (Peak Signal to Noise Ratio) is normally used to evaluate the distortion factor. It is preferable to understand that there is no direct relationship between the present index and the cryptographic strength of video data.

Accordingly, it is important to judge whether a higher distortion factor can be provided together with a security performance suitable for satisfying the service demands or service scenario, in spite of using the encryption as less as possible.

Herein, those conditions of fast encryption, keeping compression rate low, encoding format compliance, and the like may be considered essential for the video encryption.

Now, equations for checking the above three of exemplary conditions will be explained.

In the fifth line E840

$$\text{"subject to } \text{Min} \frac{T_e(x_j)}{S}\text{,"}$$

$T_e(x_j)$ means a total time required for the encryption, and S means a segment for composing the total video. The present equation is to calculate an average time required for the encryption. Those related in the art may easily understand that it is preferable to minimize the above time.

In the sixth line E850

$$\text{"} \frac{R(E_{x_j}(M_S)) - R(M_S)}{R(M_S)} \leq \alpha \text{,"}$$

$R(E_{x_j}(M_s))$ means the size of video encoded due to encryption, and $R(M_s)$ means the size of video encoded without encryption. As bigger as the difference between two of the above sizes is, a network cost due to a streaming data transmission is increasing. Therefore, it is preferable to keep the compression rate low during the encryption. For this evaluation purpose, an index α is designated as a maximum value of the compression efficiency in the above equation such that it is judged as successful when the compression efficiency is lower than the index α, wherein the index α may be determined by considering services and operating environments.

Those related in the art may understand that how much a used encryption algorithm satisfies an encoding format rule is the key to guarantee the possibility of decoding a normally encrypted video. Since, however, the aforementioned restriction cannot be expressed in a single equation or a quantitative model, such an expression as the last line E860 "satisfying format-compliance" may be used.

Figure 9A:
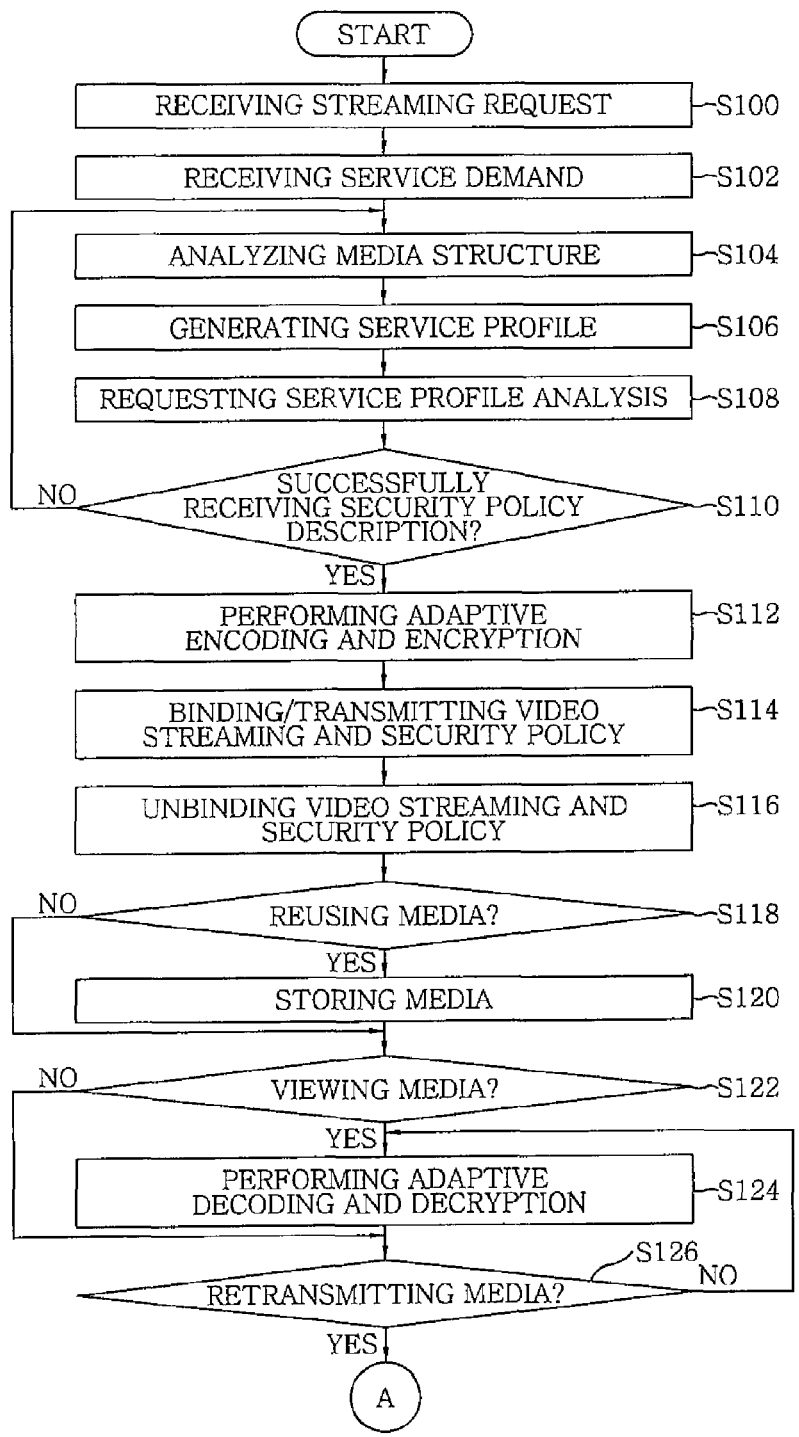
FIGS. 9A and 9B are flow charts illustrating the processes of transmitting, viewing, storing, and retransmitting streaming data, which is secured according to the adaptive security policy.
Figure 9B:
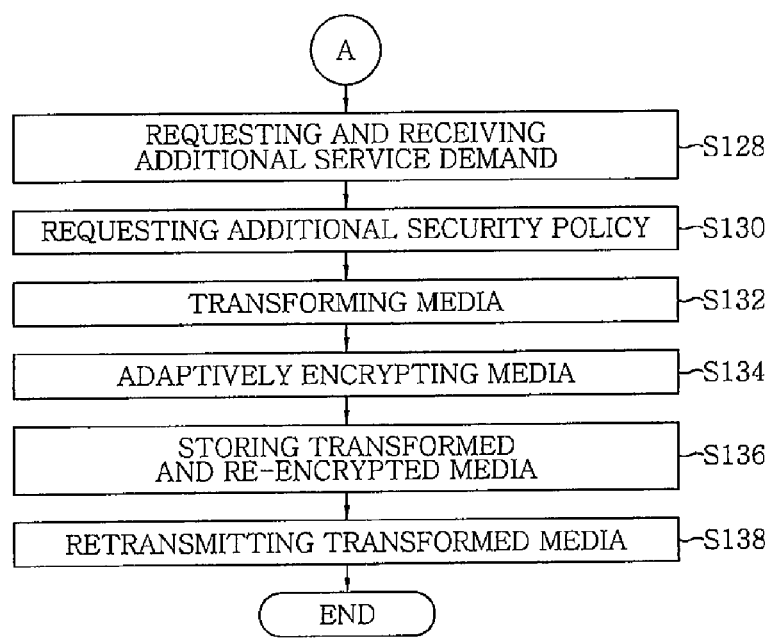

FIGS. 9A and 9B are flow charts illustrating the processes of transmitting, viewing, storing, and retransmitting streaming data, which is secured according to an adaptive policy, among the video streaming server 1000, the adaptive security policy server 2000, and the viewing terminal 4000/N in accordance with the embodiment of the present invention.

FIG. 9 refer to the case of performing a real time adaptive encoding and encryption. The encoding and encryption may be performed as a non-real time offline operation like applying various encryption algorithms for various service types during encoding, or may be selectively applied in real time in response to a user's request like a service subscription, a specific channel demand, a specific program download demand, or the like.

A shown in FIG. 9A, when receiving a streaming request and a service demand via the service demand transmitting portion 402 of the viewing terminal 4000/N (steps S100 and S102), the service demand receiving portion 106 of the video streaming server 1000 transmits the contents of the service demand and the streaming request to the service profile analysis requesting portion 104, which then requests a media structure analysis to the media encoding and interpreting portion 108 (step S104); forms a service profile by receiving and using information about a media layer structure (step S106); and requests a service profile analysis (step S108) by transmitting the service profile to the service profile receiving portion 204 of the adaptive security policy server 2000.

If it is confirmed that a security policy description is successfully received by the service profile analysis requesting portion 104 (step S110, Y), the media encoding and interpreting portion 108 and the adaptive encrypting portion 112 performs the adaptive encoding and encryption process (step S112); the streaming binding portion 110 binds and transmits a corresponding video streaming data and an issued security policy description (step S114); and the streaming unbinding portion 406 of the viewing terminal 4000/N unbinds the video streaming data and the security policy description from the network protocol (step S116).

On the other hand, if a successful reception is not confirmed (step S110, N), it returns to the step S104 of analyzing a media structure so that the previous steps S104 to S108 are repeated again, wherein the repetition may be limited to a preset number or may be set to continue for a specific time. If a successful reception is impossible in spite of such a preset repetition, it is preferable to finally decide to use a preset default security policy description instead of the desired one.

If a media reuse is requested (step S118, Y), the streaming data and the security policy description are stored from the streaming unbinding portion 406 to the terminal side media repository 412 in real time. If it is confirmed that there is no request for the media reuse (step S118, N), such a storing step S120 is not performed.

If a real time media viewing is requested (step S122, Y), the media decoding and interpreting portion 408 and the adaptive encryption/decryption portion 410 performs an adaptive decoding and decryption process (step S124). The streaming service is continued until the completion of viewing. If there is no request for the real time media viewing (step S122, N), it bypasses the step S124 and proceeds to a further next step S126.

When the adaptive decoding and decryption process is completed (step S124), it is checked whether a media retransmission is requested or not (step S126). If the media retransmission is requested, it proceeds to next steps in FIG. 9B.

In FIG. 9B, the media retransmitting portion 416 requests a second service demand to the second viewing terminal 5000/N and receives it (step S128). The security policy requesting portion 404 requests a security policy update to the security policy description generating portion 606 of the video streaming server 2000 by using the second service demand obtained from the media retransmitting portion 416 and receives it (S130). Then, a media transformation is performed by the media transforming portion 414 (step S132), and a media-adaptive encryption is performed by the media decoding and interpreting portion 408 and the adaptive encryption/decryption portion 410 (step S134). After such a transformed and re-encrypted data is stored in the terminal side media repository 412 via the media transforming portion 414 (step S136) and is transmitted to the second viewing terminal 5000/N via the media retransmitting portion 416 (step S138), the streaming service is terminated.

On the other hand, if there is no request for a media retransmission (step S126, N in FIG. 9A), the streaming service is terminated without performing the aforementioned processes in FIG. 9B.

Figure 10:
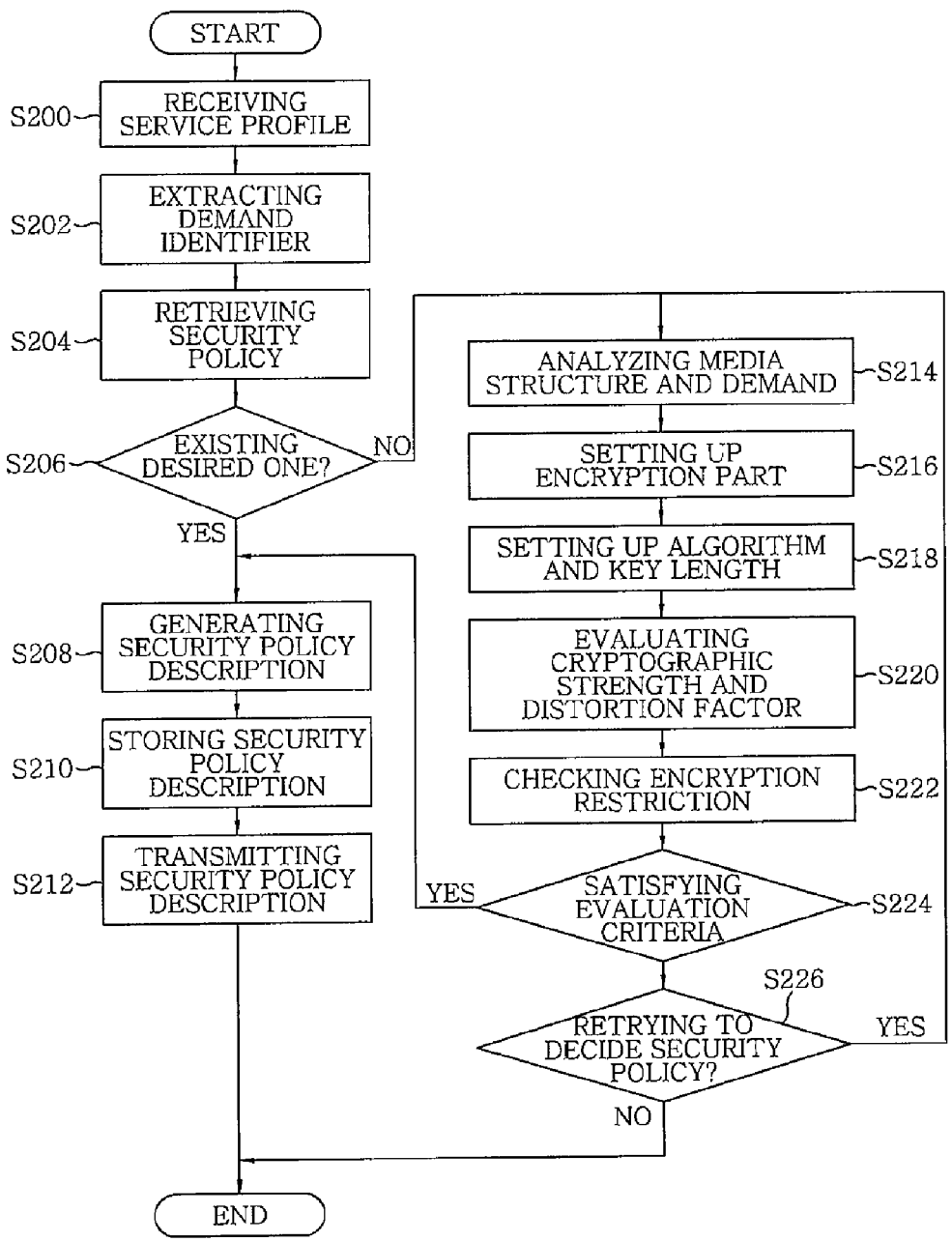
FIG. 10 is a flow chart illustrating the process of setting up and issuing a security policy description by the adaptive security policy server of FIG. 3 after receiving a service profile.

FIG. 10 is a flow chart illustrating the process in which the adaptive security policy server 2000 of FIG. 3 sets up and issues a security policy description after receiving a service profile.

As shown in FIG. 10, when receiving a service profile from the service profile analysis requesting portion 104 of the video streaming server 1000 or the security policy requesting portion 404 of the viewing terminal 4000/N (step S200), the adaptive security policy server 2000 classifies the profile data and extracts a demand identifier to analyze a media structure and a service demand (step S202), and then asked the security policy repository 802 whether there is a previously generated security policy description that corresponds to what is requested by the service profile (step S204).

If a desired one exists (step S206, Y), it is returned to the adaptive security policy server 2000, which then generates a security policy description by using it (step S208); stores (or updates) the security policy description in the security policy repository 802 (step S210); and transmits the security policy description to the service profile analysis requesting portion 104 of the video streaming server 1000 or the security policy requesting portion 404 of the viewing terminal 4000/N (step S212).

If there is no suitable security policy (step S206, N), in order to set up and issue a new security policy description, an analysis of the media structure and the service demand is initiated (step S214); parts to be encrypted are differentially designated (step S216) like in the embodiment of FIGS. 4 and 5; encryption algorithms and key lengths are set up differentially across layers (step S218) as shown in FIG. 6. Finally, when such a security policy as the embodiment of FIG. 7 is obtained, a cryptographic strength and a distortion factor are evaluated by using the equations of FIG. 8 (step S220), and it is checked whether there is any violation of the video compression rules resulted from the encryption process (step S222).

If an evaluation criteria is satisfied (step S224, Y), the new security policy description is generated (step S208) stored (step S210), and finally transmitted (step S212).

If the evaluation criteria is not satisfied (step S224, N), a retry of deciding the security policy is questioned (step S226). If the retry is confirmed (step S226, Y), it returns to the step S214 of analyzing the media structure and the service demand; and if the retry is not requested (step S226, N), the process is ended. Herein, options of the retry may be designated in the service profile, or the setup portion 600 of the adaptive security policy server 2000 may have a default setup value for the desired number of retries.

Figure 11:
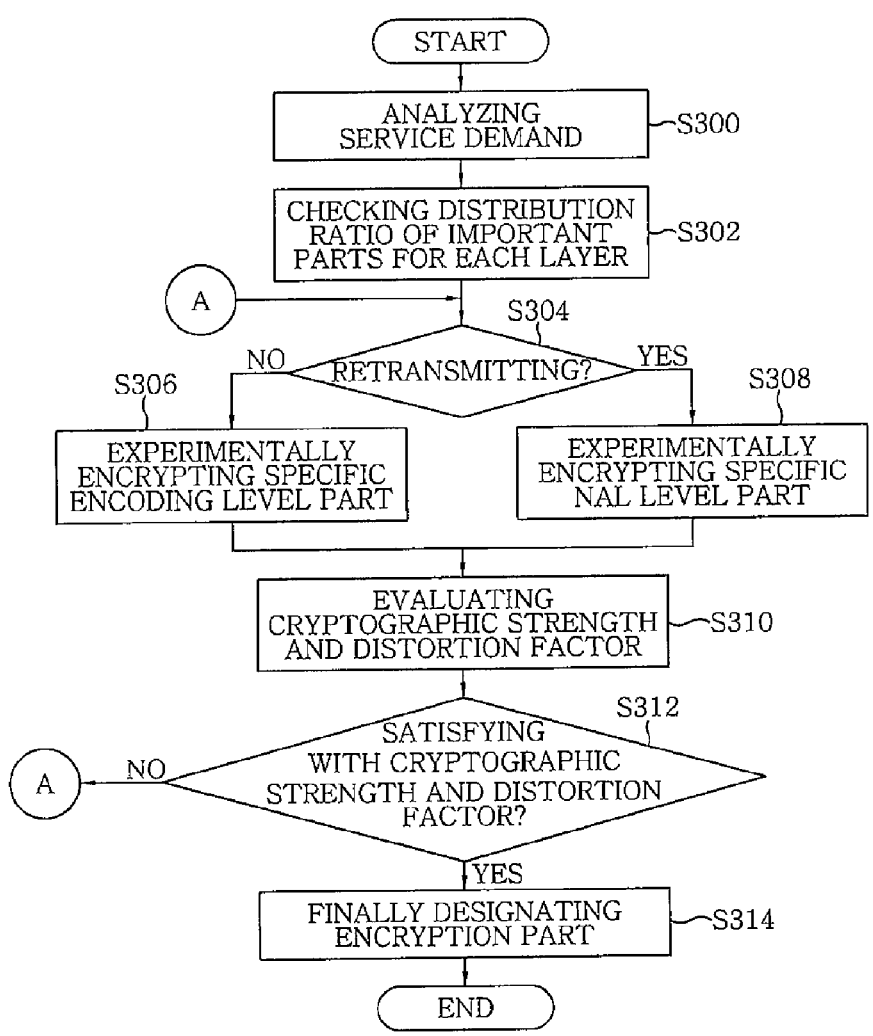
FIG. 11 is a flow chart illustrating the process of selecting parts to be encrypted, depending on the necessity of retransmission.

FIG. 11 is a flow chart illustrating the process of selecting parts to be encrypted, depending on the necessity of retransmission.

In FIG. 11, the adaptive security policy server 2000 analyzes the service demand (step S300), and then checks a distribution ratio of visually important parts of media for each layer (step S302).

If there is no request for retransmission (step S304, N), the encoding level encryption parts mentioned in the embodiment of FIG. 4 are experimentally encrypted in a sequence from the higher to the lower distribution ratio per each layer (step S306).

If there is a request for retransmission (step S304, Y), an experimental encryption is performed for selected portions of the NAL level encryption parts illustrated in FIG. 4, or for all of the encryption parts in a specific layer depending on a corresponding security level like SL5 of FIG. 5 (step S308).

Next, the cryptographic strength and the distortion factor are evaluated (step S310), by using the method in FIG. 8, for an experimental video in which the encryption parts are set up differentially across layers as shown in the embodiment of FIG. 7.

If the cryptographic strength and the distortion factor satisfy those requirements of the service demand (step S312, Y), the encryption parts are finally designated (step S314), and the process is ended.

If they are not suitable (step S312, N), it returns to a point A to repeat the aforementioned steps including the experimental encryption of specific parts.

Figure 12:
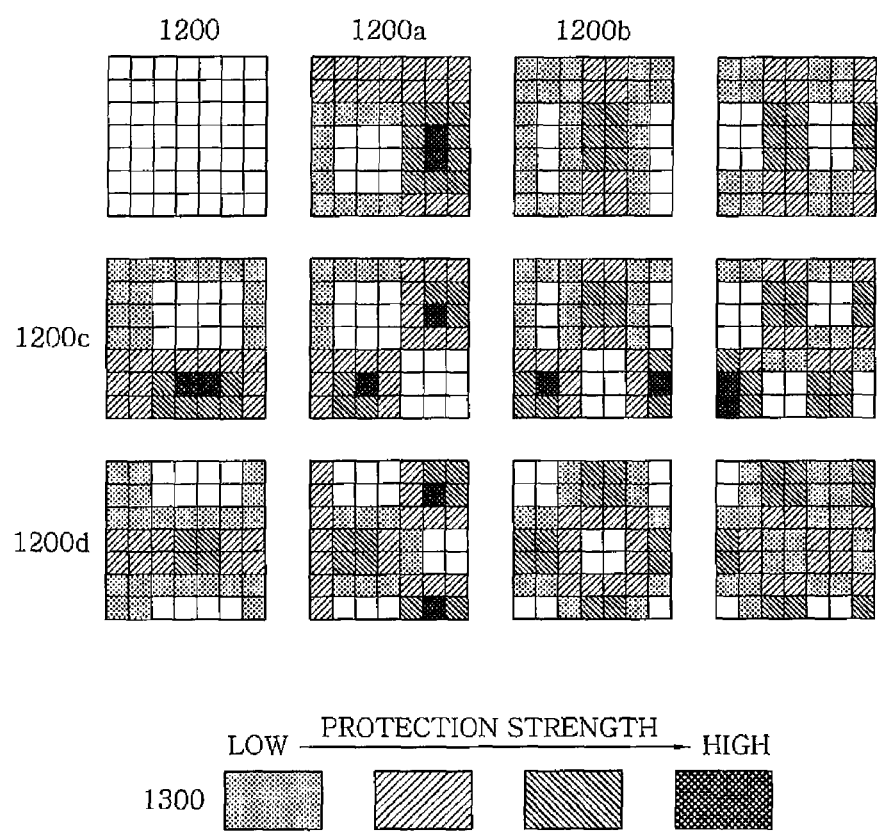
FIG. 12 is a schematic view illustrating an video frame when the adaptive encryption is applied to a scalable video image, in accordance with a preferred embodiment of the present invention.

FIG. 12 illustrates a scalable video image in the form of a video frame when the adaptive encryption in accordance with the preferred embodiment of the present invention is applied to the scalable video image.

As shown in FIG. 12, as the encryption parts and the protection strengths (that is, the cryptographic strengths) are differentiated according to the adaptive security policy, the original video 1200 (encoded without encryption) may vary into those encrypted ones 1200a to 1200d.

As the protection strength 1300 becomes stronger, stronger encryption algorithm and more complicated key are used to encrypt the video segment.

Figure 13:
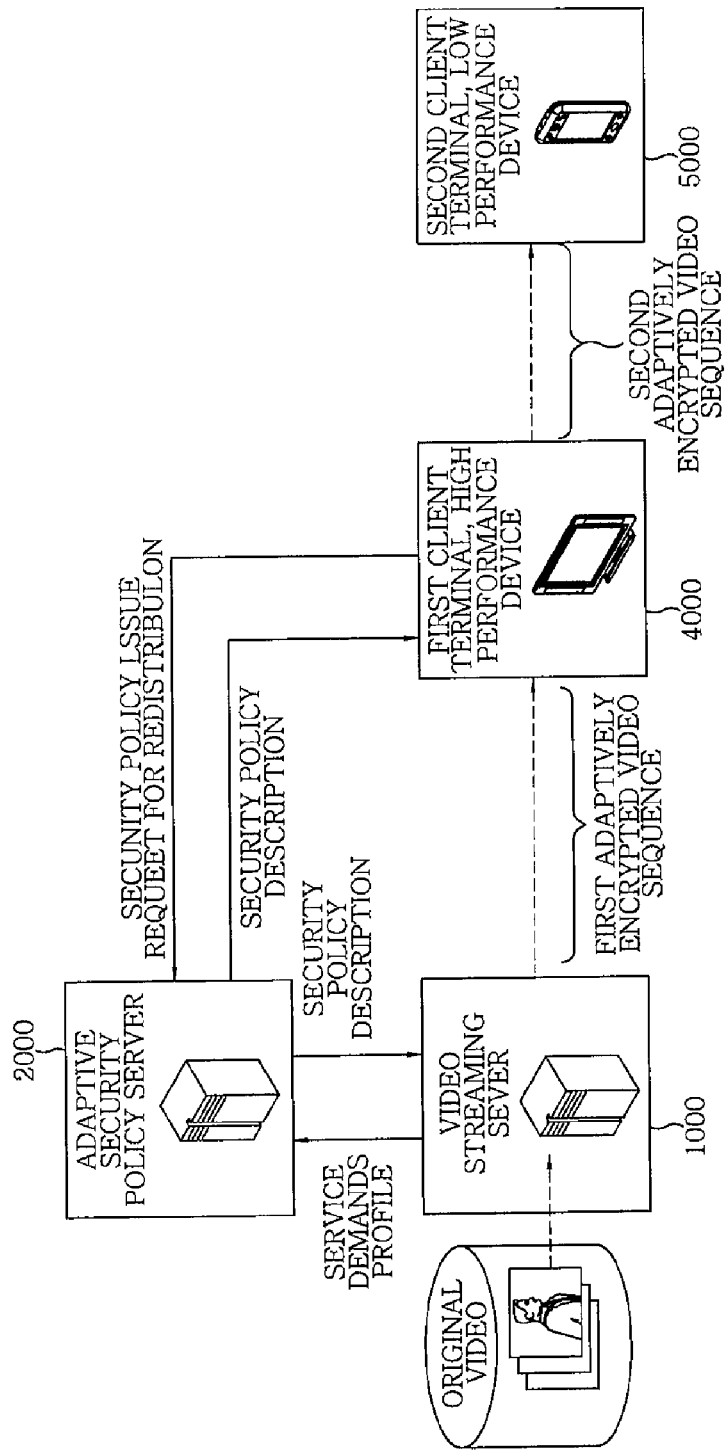
FIG. 13 is schematic block diagram illustrating the process of transmitting video images, which are differentially encrypted by using the adaptive security policy description, for a scalable video service via those configurations shown in FIGS. 1 and 2, thereby enabling a first and a second client viewing.

FIG. 13 is schematic block diagram illustrating the process of transmitting video images, which are differentially encrypted by using the adaptive security policy description provided by the adaptive security policy server 2000, from the video streaming server 1000 to a client terminal, for example, the 1st client terminal 4000/1 of the first terminal group 4000 or the 1st client terminal 5000/1 of the second terminal group 5000.

In FIG. 13, an original video is transformed into a first adaptively encrypted video sequence via the co-operations among the video streaming server 1000, the adaptive security policy server 2000, and the first terminal group 4000. The first video sequence is then transmitted to the first terminal group 4000. If a retransmission is requested, the first terminal group 4000 transforms the first video sequence into a second adaptively encrypted video sequence by differentially changing video qualities and encryption rates according to the service demand from the second terminal group 5000, and then transmits the second video sequence to the second terminal group 5000.

In accordance with the aforementioned embodiments of the present invention, the encryption parts, algorithms, and key lengths are set up differentially across layers for SVC based scalable video contents in respect of three main points such as the cryptographic strength, the distortion factor, and the restrictions. Further, the present invention provides a safe method of readjusting the cryptographic strength and the distortion factor without such processes as decoding, decryption, and re-encoding, depending on the characteristics of a storage terminal (the first viewing terminal) or a reuse terminal (the second viewing terminal), thereby enabling a more reliable video streaming service.

While the invention has been shown and described with respect to the preferred embodiments, it will be understood by those skilled in the art that various changes and modifications may be made without departing from the scope of the invention as defined in the following claims.

What is claimed is:

1. An adaptive security policy based scalable video service apparatus, comprising:
   a video streaming server that receives a service demand via a network and generates encrypted streaming data;
   an adaptive security policy server that analyzes a media structure and the service demand, by using a service profile received from the video streaming server, so as to generate a security policy description, wherein the security policy description defines a part to be encrypted, an encryption algorithm, and an encryption key length for each layer of video data; and
   a terminal that generates and transmits the service demand to the video streaming server or the adaptive security server, obtains the encrypted streaming data from the video streaming server, and decrypts the encrypted streaming data for playback, storing, and retransmission.

2. The apparatus of claim 1, wherein the video streaming server operates a server side media repository and performs an adaptive encryption during a media encoding process by using the security policy description received from the adaptive security server.

3. The apparatus of claim 1, wherein the video streaming server includes:
a service demand receiving portion that receives the service demand from the terminal;
a service profile analysis requesting portion that forms the service profile by using the received service demand and media layer structure information, transmits thus generated service profile to the adaptive security policy server and collects the security policy description from the adaptive security policy server;
a media encoding and interpreting portion that analyzes a media layer structure to generate the media layer structure information and performs a media encoding;
a server side media repository that stores a non-encrypted original media data;
an adaptive encryption portion that performs an adaptive encryption according to the security policy description during a media encoding; and
a streaming binding portion that adaptively transmits the encrypted streaming data to the terminal via the network.

4. The apparatus of claim 1, wherein the terminal includes:
a service demand transmitting portion that forms and transmits the service demand to the video streaming server;
a streaming unbinding portion that receives the encrypted streaming data from the video streaming server, and extracts and classifies the received encrypted streaming data into a video and the security policy;
a media decoding and interpreting portion that decodes the encrypted streaming data transmitted from the streaming unbinding portion, and analyzes an encryption part thereof to be encrypted for each layer;
a terminal side media repository that stores the encrypted streaming data transmitted from the streaming binding portion;
a media retransmitting portion that retransmits, when receiving a retransmission request from a secondary viewing terminal, a media from the terminal side media repository to the secondary viewing terminal, the media being transformed and having a readjusted cryptographic strength;
a security policy requesting portion that transmits, when the media retransmitting portion requests to issue a new security policy description, a new security policy description issuance request message to the adaptive security policy server and transmits, when receiving the new security policy description from the adaptive security policy server, the new security policy description to the media decoding and interpreting portion;
an adaptive encryption/decryption portion that performs an adaptive decryption when the media decoding and interpreting portion decodes, or performs an adaptive encryption when readjusting the cryptographic strength for the retransmission; and
a media transforming portion that transforms a media layer structure based on a service demand of the secondary viewing terminal, when the retransmission is requested.

5. The apparatus of claim 1, wherein the adaptive security policy server sets up the part to be encrypted, the encryption algorithm, and the encryption key length for each layer, and checks a cryptographic strength, a distortion factor, and a restriction according to the analyzed media structure and demand.

6. The apparatus of claim 1, wherein the adaptive security server includes:
an analyzing portion that analyzes the media structure and the service demand;
a setup portion that designates the part to be encrypted, the encryption algorithm, and the encryption key length for each layer, and verifies an effectiveness thereof, so as to generate the security policy description; and
a repository portion that stores and manages the security policy description generated by the setup portion.

7. The apparatus of claim 6, wherein the analyzing portion includes:
a service profile receiving portion that receives a request for issuing the security policy description from the video streaming server or the terminal, and extracts information on the media structure and the service demand therefrom;
a media structure and demand analyzing portion that analyzes the media structure and the service demand by using the information extracted by the service profile receiving portion, and transmits the analyzed contents to the setup portion so as to request the description generation.

8. The apparatus of claim 6, wherein the setup portion includes:
an encryption part setup portion that receives a request for setting up a security policy, and decides the part to be encrypted for each layer;
an algorithm and key length setup portion that decides the encryption algorithm and the encryption key length for each layer;
a checking portion that checks an effectiveness of a cryptographic strength, a distortion factor, and a restriction of an initial version security policy obtained via the encryption part setup portion and the algorithm and key length setup portion; and
a security policy description generating portion that generates and transmits the security policy description to the video streaming server or the terminal after the checking process is completed by the checking portion.

9. The apparatus of claim 6, wherein the repository portion includes a security policy repository that stores, updates and deletes a security policy, according to a request from the security policy description generating portion.

10. An adaptive security policy based scalable video service method for providing a video streaming service from a video streaming server to a terminal, the method comprising:
receiving from the video streaming server a service policy description issuance request along with a service profile;
extracting a service demand and media layer structure information from the service profile;
analyzing the service demand and checking a distribution ratio of visually important parts of a scalable video;
generating a security policy description based on the service demand and the distribution ratio, wherein the security policy description defines a part to be encrypted, an encryption algorithm, and an encryption key length for each layer of video data;
storing the security policy description in a database; and
transmitting the security policy description to the video streaming server.

11. The method of claim 10, wherein said generating the security policy description includes:
- designating, based on a policy table that considers both a security level and the service demand, the part to be encrypted for each layer;
- setting up, for each layer, the encryption algorithm and the encryption key length while considering a cryptographic strength and an encryption speed;
- generating a draft security policy description including the part to be encrypted, the encryption algorithm, and the encryption key length;
- performing test encryption based on the draft security policy;
- evaluating the test encryption to determine whether the draft security policy description satisfies a preset criteria; and
- generating the security policy description based on the draft security policy description satisfying the preset criteria.

12. The method of claim 11, wherein said evaluating the test encryption includes:
- evaluating a cryptographic strength;
- evaluating a distortion factor;
- evaluating an encryption speed and changes on a video encoding compression ratio; and
- verifying compliance of a video compression rule.

13. The method of claim 10, further comprising:
- querying the database to find therein a security policy description satisfying the service profile, and transmitting to the video streaming server the security policy description found in the database.

14. The method of claim 10, further comprising:
- receiving from the terminal a service policy description issuance request for retransmission along with a service demand for retransmission; and
- generating a security policy description for retransmission and transmitting the security policy description for retransmission to the terminal.

15. The method of claim 14, wherein said generating the security policy description for retransmission includes:
- selecting a network abstract layer level part to be encrypted, an encryption algorithm, and a encryption key length for each layer;
- generating a draft security policy description including the part to be encrypted, the encryption algorithm, and the encryption key length;
- performing test encryption based on the draft security policy;
- evaluating the test encryption to determine whether the draft security policy description satisfies a preset criteria; and
- generating the security policy description for retransmission based on the draft security policy description satisfying the preset criteria.

16. An adaptive security policy based scalable video service method of a terminal for providing a scalable video service by receiving encrypted data from a video streaming server, the method comprising:
- transmitting a streaming service request along with a service demand to the video streaming server;
- separately extracting video data, a security policy description, and streaming control data from the encrypted data received from the video streaming server, wherein the security policy description defines a part to be encrypted, an encryption algorithm, and an encryption key length for each layer of the video data; and
- performing adaptive decryption on the video data based on the security policy description.

17. The method of claim 16, further comprising:
- transmitting, when receiving from other terminal a request for retransmission of the video data, the video data to said other terminal.

18. The method of claim 17, wherein said transmitting the video data to said other terminal includes:
- receiving from said other terminal a service demand for the retransmission;
- requesting an adaptive security policy server to issue, based on the service demand for the retransmission, a security policy description for the retransmission;
- receiving the security policy description for the retransmission from the adaptive security policy server; and
- performing encryption on the video data based on the security policy description for the retransmission.

19. The method of claim 16, wherein when receiving the streaming service request along with the service demand from the terminal, the video streaming server forms a service profile by merging layer structure information on the video data with the service demand, and then requests an adaptive security policy server to issue the security policy description based on the service profile.

20. The method of claim 19, wherein the video streaming server performs adaptive encryption on the video data based on the security policy description received from the adaptive security policy server, and then transmits to the terminal the encrypted video data together with the security policy description and the streaming control data.

* * * * *